(12) United States Patent
Shinotsuka et al.

(10) Patent No.: US 7,221,808 B2
(45) Date of Patent: *May 22, 2007

(54) IMAGE PROCESSING DEVICE

(75) Inventors: Sukeyuki Shinotsuka, Sayama (JP); Hideo Seki, Sayama (JP)

(73) Assignee: Honda Giken Kogyo Kabushiki Kaisha, Minato-Ku, Tokyo (JP)

( * ) Notice: Subject to any disclaimer, the term of this patent is extended or adjusted under 35 U.S.C. 154(b) by 716 days.

This patent is subject to a terminal disclaimer.

(21) Appl. No.: 10/609,493

(22) Filed: Jun. 24, 2003

(65) Prior Publication Data

US 2004/0090545 A1 May 13, 2004

(51) Int. Cl.
*G06K 9/40* (2006.01)

(52) U.S. Cl. .................. 382/274; 250/205; 345/20; 348/251; 358/461

(58) Field of Classification Search ........... 382/274; 250/205; 345/20; 348/251; 358/461
See application file for complete search history.

(56) References Cited

U.S. PATENT DOCUMENTS 5,420,631 A * 5/1995 Hamasaki ............ 348/229.1
5,808,677 A * 9/1998 Yonemoto ............ 348/308
6,163,621 A * 12/2000 Paik et al. ............ 382/169
6,463,173 B1 * 10/2002 Tretter ............ 382/168
2002/0025079 A1 * 2/2002 Kuwata et al. ............ 382/254

FOREIGN PATENT DOCUMENTS

JP 11-211565 8/1999
JP P2000-329616 11/2000

* cited by examiner

*Primary Examiner*—Jingge Wu
*Assistant Examiner*—Aaron Carter
(74) *Attorney, Agent, or Firm*—Fulbright & Jaworski L.L.P.

(57) ABSTRACT

An image processing device for emphasizing a specified luminance area of an image taken by an image sensor. The contrast between a bright portion and a dark portion of an image taken by the image sensor having a wide dynamic range of a logarithmic output characteristic can be increased by selectively emphasizing the image sensor output of any luminance area by using an output characteristic conversion table.

6 Claims, 15 Drawing Sheets

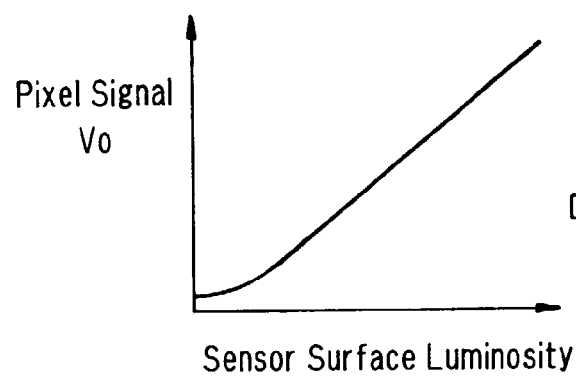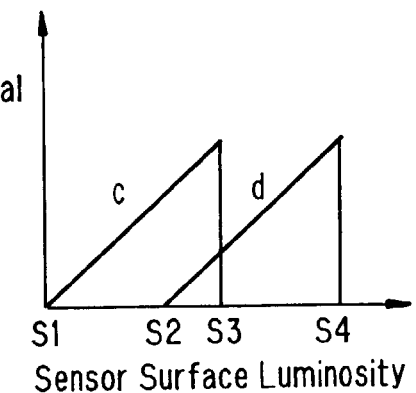
FIG. 14(a)  FIG. 14(b)
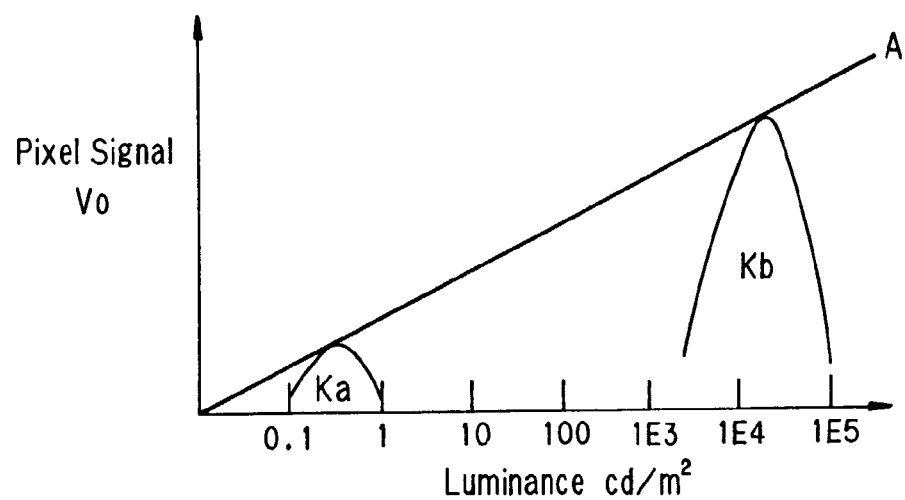
FIG. 15

IMAGE PROCESSING DEVICE

BACKGROUND OF THE INVENTION

The present invention relates to an image processing device for emphasizing a specified luminance portion of an image taken by an image sensor.

Usually, in the case of taking a picture of an object having a bright objective portion (high light portion) and a dark surrounding portion (shadow portion) such as for example a road viewed toward the outlet (or the inlet) of a tunnel from the inside (or the outside) thereof for monitoring a white line marked on the road in front of a vehicle running thereon or an image of a working site where welding, laser machining or plasma machining is conducted, it is highly required to use an image sensor having a sufficiently wide dynamic range.

Referring to FIG. 27, there is shown a state of a weld joint being formed by the laser beam welding on a metal surface where the weld portion comprises a key hole, a molten pool formed by heating with a laser beam at a high temperature and a bead portion formed by solidified weld metal behind the molten pool. To determine whether the welding is well conducted, it is needed to monitor the states of the high bright keyhole portion including the molten pool and the low bright bead portion at a time on the same image. For this purpose, it is needed to use an image sensor having a sufficiently wide dynamic range.

Japanese Laid-Open Patent Publication No. 11-211565 discloses a conventional MOS type image sensor composed of a plurality of light sensor circuits, each of which represents one unit pixel and comprises, as shown in FIG. 1, a photo-diode PD for producing a sensor current proportional to the quantity of incident light Ls falling thereon, a transistor Q1 for charging and discharging a parasitic capacity C of the photodiode, a transistor Q2 for amplifying the voltage signal Vpd at a terminal of the photodiode PD and a transistor Q3 for outputting a sensor signal in accordance with a timing pulse of a readout signal Vs, wherein the sensor current produced in the photodiode is converted into a voltage signal Vpd by the transistor Q1 having a logarithmic output characteristic in a weak inverse state and having a gate voltage VG fixed at a certain level to serve as an overflow drain.

The above-mentioned image sensor can produce an output having logarithmic characteristic while a sufficient quantity of light Ls is falling on the photodiode PD. However, if the sensor circuit current decreased with a small quantity of incident light, then its output characteristic becomes non-logarithmic because of a delayed response to charging and discharging parasitic capacity C. In FIG. 3 hereof, there is shown a non-logarithmic response area WA and a logarithmic response area WB.

Japanese Laid-Open Patent Publication No. 11-21565 discloses an image sensor composed of a plurality of light-sensor circuits (FIG. 1) each representing a single pixel, which is improved so that output characteristic of each sensor circuit at a small quantity of incident light may be logarithmic in all the output range and the sensor output may be converted into a specified output characteristic using a lookup table to reduce an amount of information and facilitate post-processing such as for example multi-gradient sampling. However, the image sensor using light-sensor circuits having a logarithmic output characteristic for attaining a wide dynamic range can take an image covering a wide range from a high bright portion to a dark portion but it may suffer insufficient contrast of the image because of logarithmic compression of luminance.

SUMMARY OF THE INVENTION

An object of the present invention is to provide an image processing device capable of emphasizing the contrast of a specified luminance portion of an image taken by an image sensor having a logarithmic output characteristic with an increased dynamic range, which has a means for selectively emphasizing an image sensor output in any plural luminance range by using an output characteristic conversion table so as to increase the contrast of each image portion in any luminance areas of the image output by the image sensor.

BRIEF DESCRIPTION OF THE DRAWINGS

FIGS. 14(a) and 14(b) show a further example of conversion of an image sensor output characteristic by using a lookup table.

FIG. 15 is a graph showing a relation between the output characteristic of an image sensor and the luminance distribution on an image of a road in and out of a tunnel.

PREFERRED EMBODIMENTS OF THE PRESENT INVENTION

Figure 1:
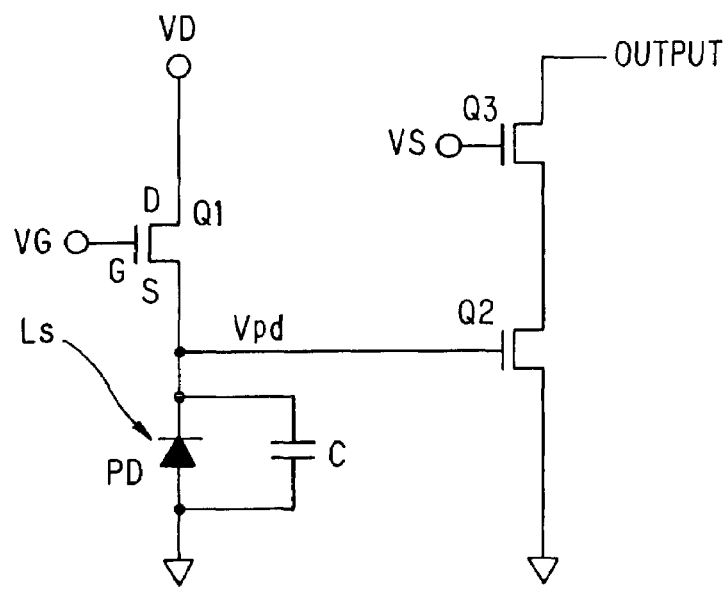
FIG. 1 is an exemplary circuit diagram of a light sensor circuit for one pixel, which is used as a unit component of an image sensor according to the present invention.

FIG. 1 illustrates a light sensor circuit representing a unit pixel, which is used as a unit component in an image sensor to which the present invention relates.

Figure 26:
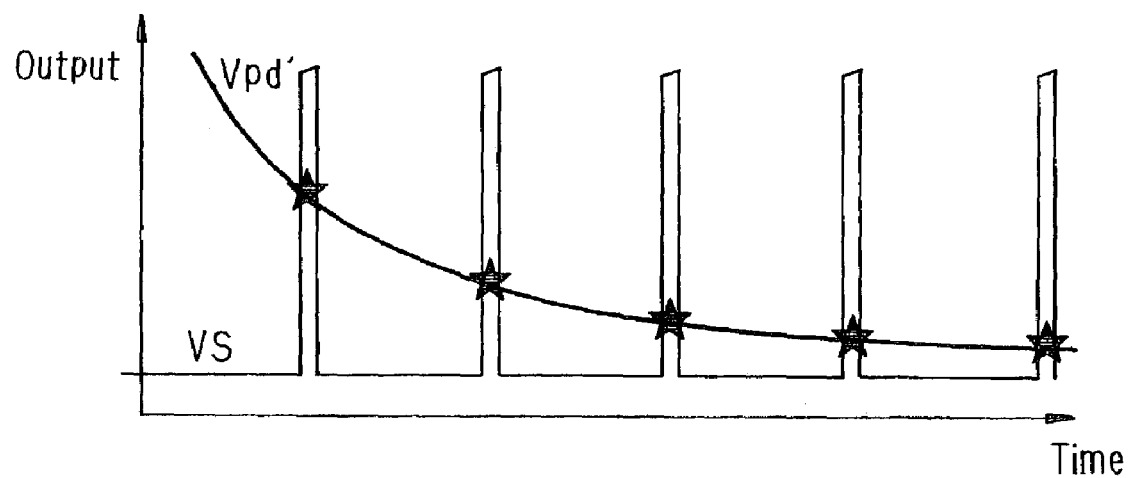
FIG. 26 shows timings of reading an image signal with a small quantity of incident light if no initialization of the light sensor circuit was made.

The light sensor circuit can produce a sensor current in the transistor Q1 while a sufficient quantity of light Ls is falling on the photodiode PD and can therefore detect a light signal at a response speed sufficient not to produce an afterimage of the pixel owing to a relatively small value of resistance of the transistor Q1. However, since the transistor Q1 is set to operate with resistance increased by one order when a current therein decreases by one order, decreasing the current flowing in the transistor Q1 with a decrease in the quantity of incident light Ls falling on the photodiode PD causes the transistor Q1 to rapidly increase its resistance. At the same time, a time constant of the circuit containing a parasitic capacitor C of the photodiode PD with the increased resistance is increased to elongate the time necessary for removing an electric charge accumulated in the parasitic capacitor C. As a result, an afterimage can be viewed for a longer duration as the quantity of incident light Ls decreases. In case of outputting an image signal Vo at an interval of, e.g., 1/30 second at a small quantity 1E-12A of sensor current, the voltage signal Vpd cannot be saturated within the interval. Namely, the saturation time of a voltage signal Vpd corresponding to a sensor current in the photodiode PD with a decreased quantity of incident light thereto also increases. Therefore, if a pixel signal Vo is output in accordance with timing pulses of a reading signal Vs as shown in FIG. 26, then an output appears with an afterglow that may be of a higher level at an earlier time. In FIG. 26, Vpd' designates an inverse amplified voltage signal produced by the amplifying transistor Q2.

According to the present invention, the light sensor circuit is capable of initializing itself before detecting a pixel signal Vo by removing an electric charge accumulated in a parasitic capacitor C of the photodiode PD by changing a drain voltage VD of the transistor Q1 to a level lower than normal for a specified period. This enables the light sensor circuit to immediately obtain a voltage signal corresponding to the quantity of incident light Ls at that time even if a sensor current rapidly changed. Thus, the light sensor circuit may not cause an afterglow of the pixel even with a small quantity of incident light Ls.

Figure 2:
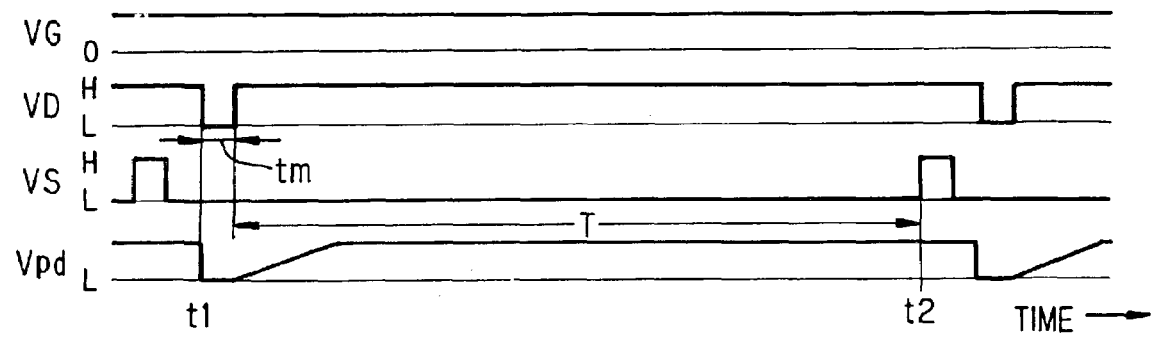
FIG. 2 is a time chart of signals to be generated in the light sensor circuit.
Figure 3:
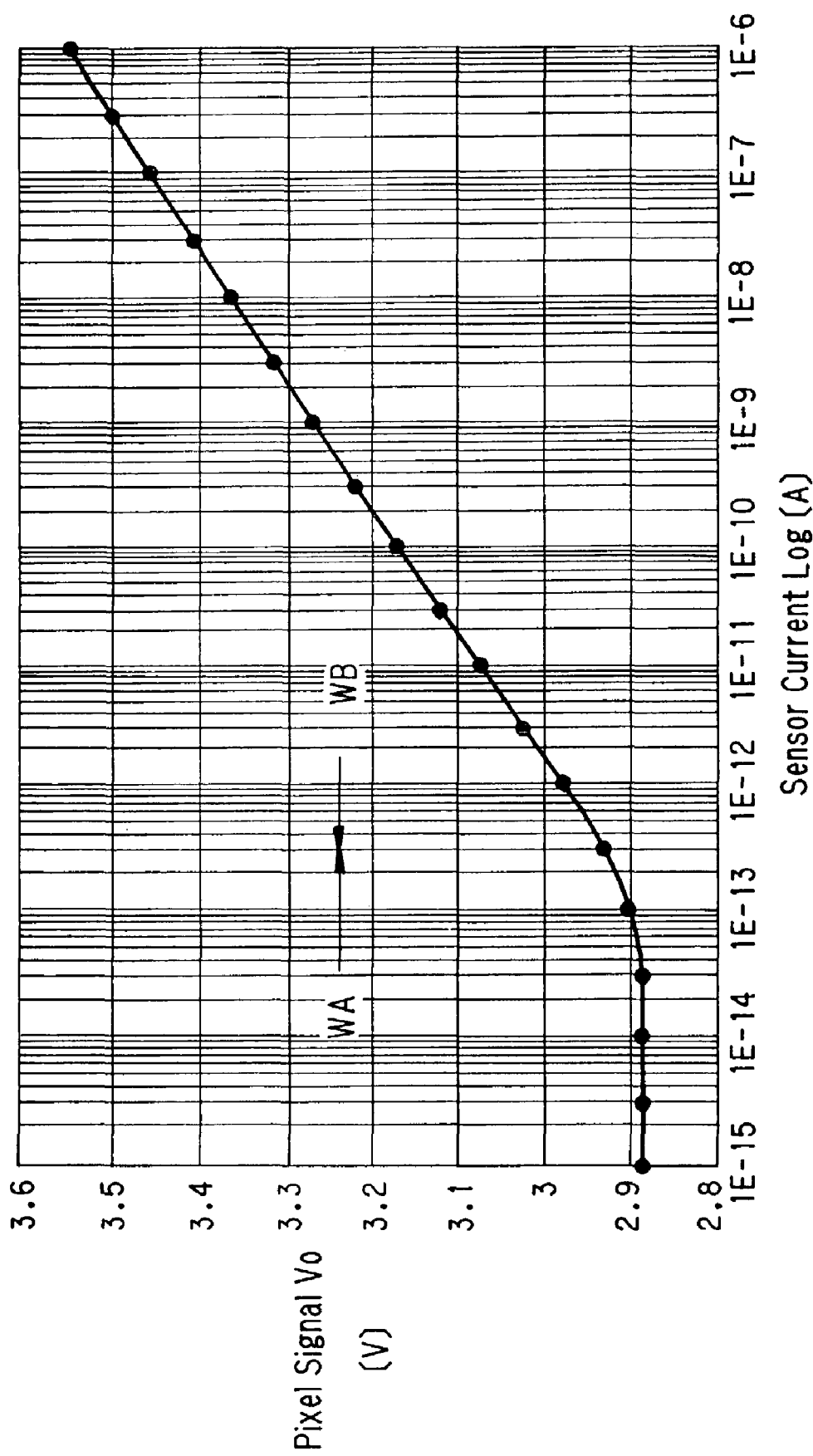
FIG. 3 is a graph showing a relation between an output characteristic of a pixel signal and a quantity of light falling on a light sensor circuit.

FIG. 2 shows a time chart of signals produced at various portions of the light sensor circuit. In FIG. 2, t1 is an initializing timing pulse and t2 is a light-signal detection timing pulse. A specified time tm for which the drain voltage VD of the transistor Q1 is switched from a normal value (high level H) to a lower voltage value (low level L) and kept at the low level L is set for example to about 5 microseconds in case of reading one pixel at a speed of about 100 nanoseconds. In FIG. 2, T designates a period for accumulating a charge in a parasitic capacitor C of the photodiode PD, which period is about 1/30 (or 1/60) seconds for a NTSC signal.

In the light sensor circuit, once the drain voltage VD of the MOS transistor Q1 was switched over to the low level L for initializing the circuit, the transistor Q1 is brought into the low-resistance state if a potential between the gate voltage VG and the drain voltage VD is greater than a threshold of the transistor Q1. Therefore, the source side potential at that moment becomes equal to the drain voltage VD (the source voltage for n-MOS transistor is equal to the drain voltage), causing the junction capacitor C of the photodiode C to be discharged.

Figure 4:
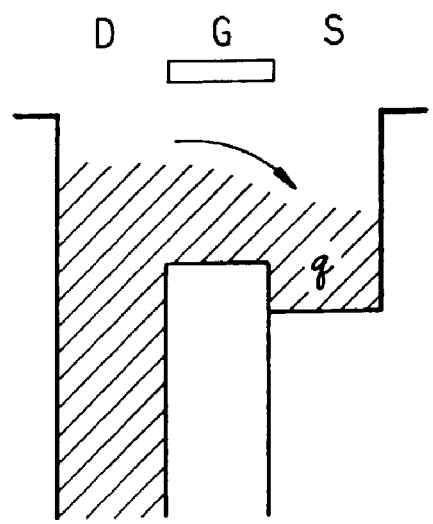
FIG. 4 is a mimic illustration of the operation state of a transistor Q1 with a flow of an electric charge (q) therein when initializing the light sensor circuit.

FIG. 4 is a mimic illustration of the operation of the light sensor circuit by a flow of electric charge q of the transistor Q1 when initializing the circuit.

Once the drain voltage VD of the transistor Q1 was changed to the normal value (high level H) with an elapse of the time tm and a light signal was then detected, the source side potential becomes lower than the drain voltage VD. If the difference between the gate voltage VG and the drain voltage VD is larger than the threshold, the MOS type transistor Q1 reaches the low-resistance state and allows the junction capacitor C of the photodiode to be charged again.

Figure 5:
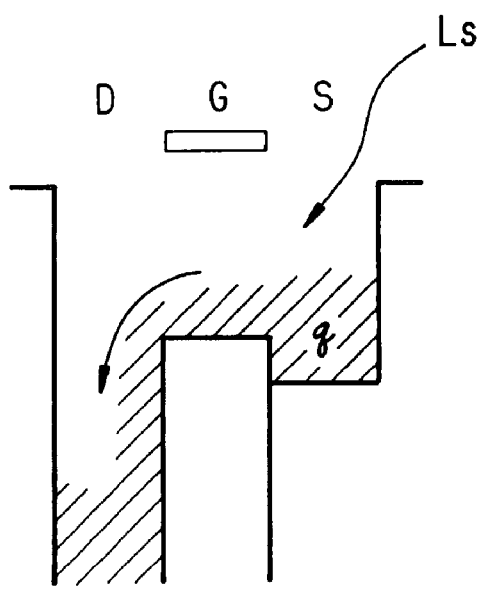
FIG. 5 is a mimic illustration of the operation state of a transistor Q1 with a flow of an electric charge (q) therein when detecting a light signal of the light sensor circuit.

FIG. 5 is a mimic illustration of the operation of the light sensor circuit by a flow of electric charge q of the transistor Q1 when detecting a light signal. The junction capacitor C of the photodiode PD is discharged for initializing the light sensor circuit before detecting a light signal and then charged again. In this case, the output voltage Vpd (a terminal voltage of the photodiode PD) with an elapse of a specified time from the initializing timing attains a value corresponding to the quantity of incident light Ls. In other words, the light sensor circuit after initialization can obtain a discharging characteristic with a specified time constant in response to a change in the quantity of incident light Ls.

In that case, if the light sensor circuit is left as it is for a long time, a current supplied from the drain voltage VD through the transistor Q1 becomes equal to a current flowing in the photodiode PD. The same discharging characteristic can be thus always maintained as far as no charge remains. This prevents the occurrence of afterglow of the pixel.

The light sensor circuit can therefore obtain a pixel signal Vo corresponding to the quantity of incident light Ls with no afterglow of the pixel by detecting a light signal with an elapse of a specified time after initialization of the circuit.

Figure 6:
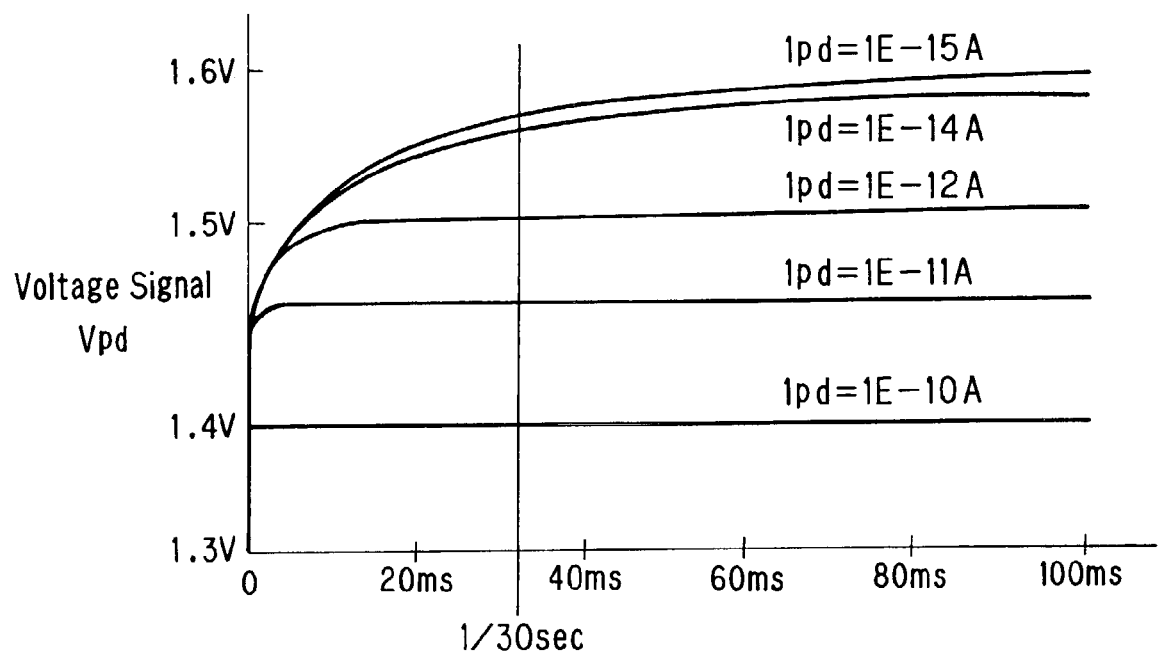
FIG. 6 shows characteristic curves of a voltage signal (Vpd) changing in rising time with a change in quantity of an incident light signal in the light sensor circuit.

FIG. 6 illustrates a difference in the rising time of a voltage signal Vpd with a change in the quantity of incident light Ls falling on the light sensor circuit.

Figure 7:
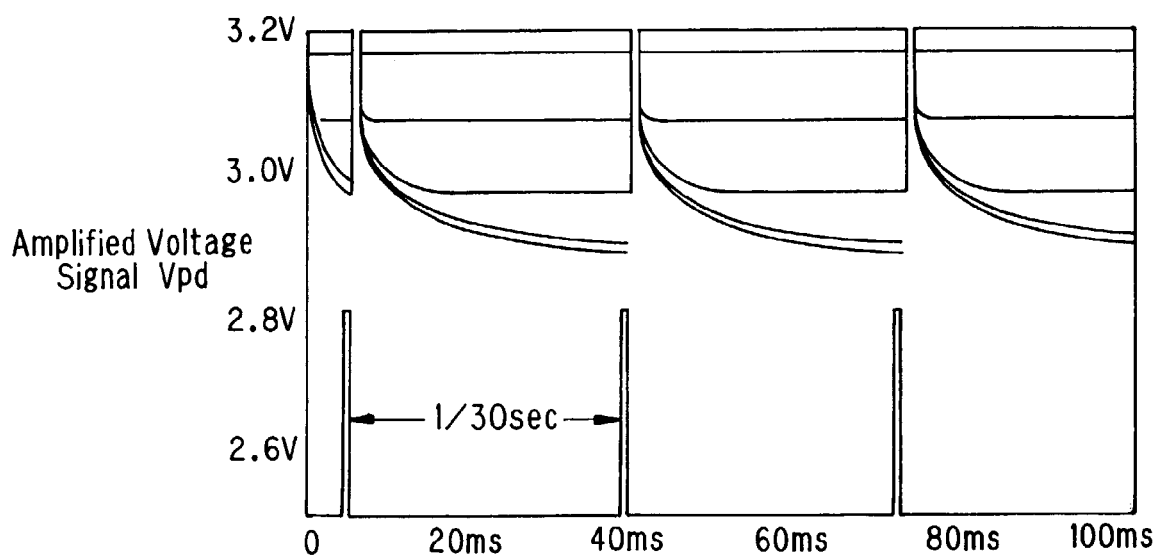
FIG. 7 shows characteristic curves of a voltage (Vpd) amplifying signal when the light signal reading-out operation is repeated at a specified time interval by the light sensor circuit.

FIG. 7 shows characteristics of the amplified voltage signal Vpd when light signals were repeatedly read at an interval of 1/30 sec. The diagram indicates that the signal characteristics obtained every 1/30 seconds correspond to the sensor current proportional to the quantity of incident light Ls falling on the photodiode PD with no effect of afterglow of the pixel.

Figure 8:
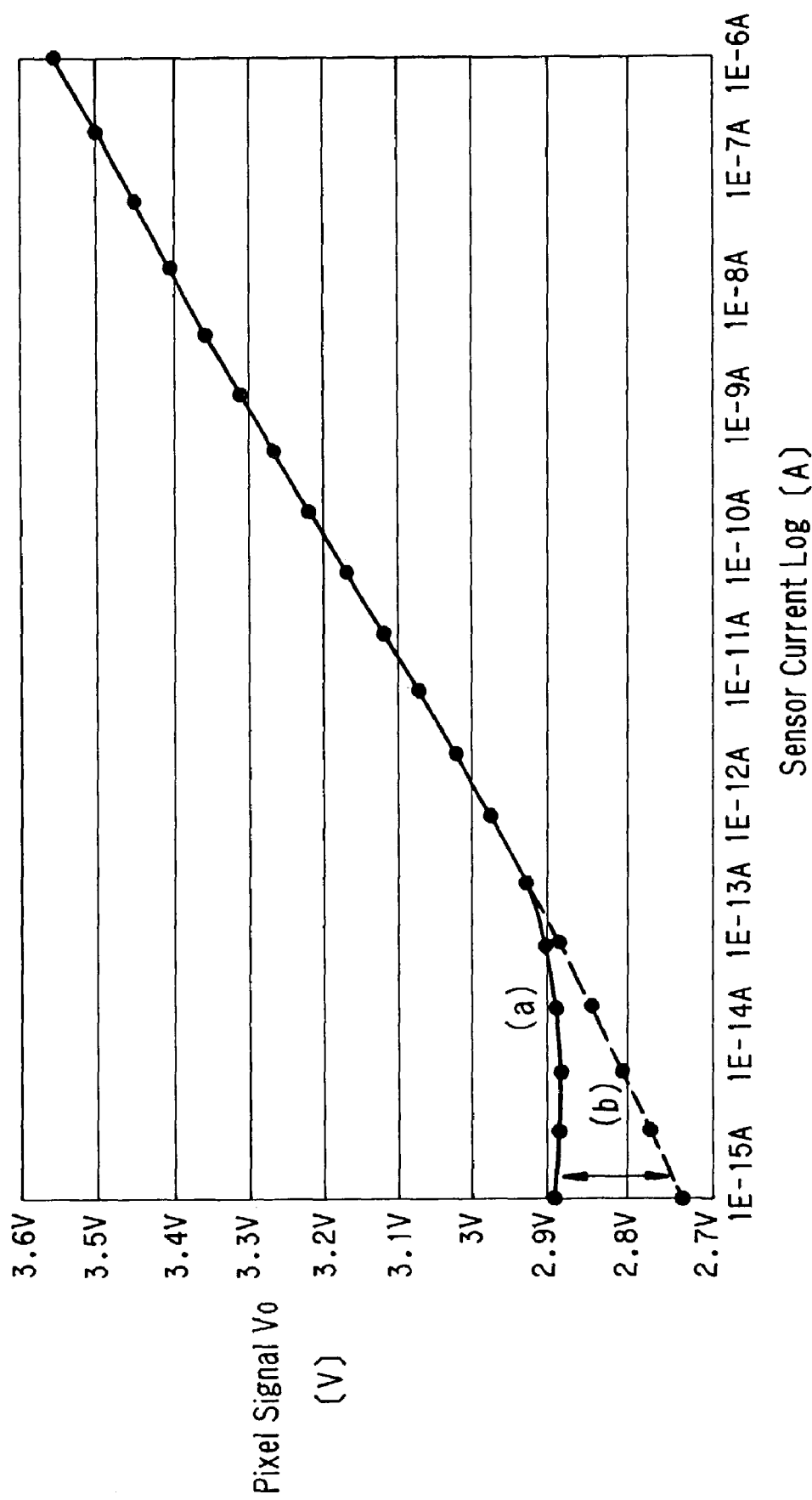
FIG. 8 shows output characteristics of pixel signals (Vo) with a change of the quantity of incident light (Ls) falling on a photodiode of the light sensor circuit.

FIG. 8 shows an output characteristic of a pixel signal Vo, which was obtained by changing the sensor current corresponding to the quantity of incident light Ls falling on the photodiode PD. The diagram indicates that the sensor signal has a complete logarithmic output characteristic at the sensor current of IE-13A or more in the photodiode PD. It is also found that the output signal is not logarithmic at the sensor current of less than IE-13A but does not cause afterglow.

The diagram also indicates that the output characteristic shown in portion (a) of FIG. 8 can be obtained by adjusting the threshold of the low level L (to which the drain voltage VD of the transistor Q1 must be changed) and by decreasing the drain voltage until the transistor Q1 gets the state of completely low resistance. On the contrary, the normal logarithmic output characteristic shown in portion (b) of FIG. 8 can be obtained by setting the control voltage VD to the same value that the gate voltage VG has.

Therefore, the output characteristic in portion (a) of FIG. 8 is free from the effect of pixel afterglow but the light signal detecting sensitivity is decreased with a small quantity of incident light while the output characteristic in portion (b) of FIG. 8 may obtain a high detection sensitivity at a small quantity of incident light but may have a remarkable afterglow. In other words, there is a trade-off relation between the detection sensitivity and afterglow.

Therefore, it is desirable to adjust the drain voltage VD of the transistor to obtain the output characteristic in an intermediate region between the output characteristic shown in portion (a) of FIG. 8 and the logarithmic output characteristic shown in portion (b) of FIG. 8 on the following condition:

For the applications where the afterglow is admitted, the drain voltage of the transistor must be set to a value at which the higher detection sensitivity is obtained. On the contrary, for the applications where the afterglow must be avoided, the drain voltage must be set to a value at which no afterglow may be produced. In practice, the drain voltage VD is adjusted to a value selected for obtaining the highest detection sensitivity in view of the actual application and the actual permissible afterglow.

Figure 9:
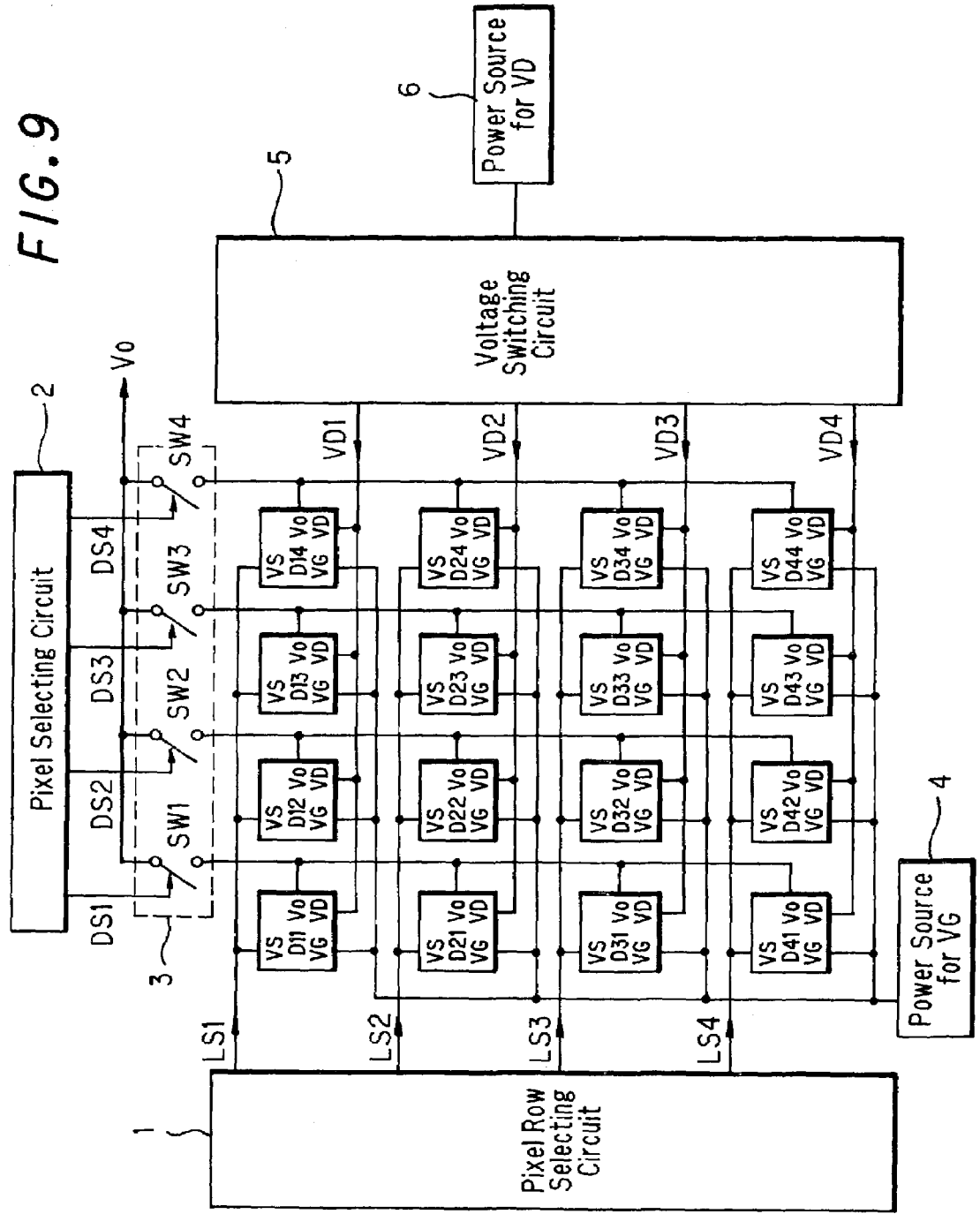
FIG. 9 is an exemplary block diagram of an image sensor composed of a plurality of light sensor circuits forming a matrix of pixels.

FIG. 9 shows an exemplary construction of an image sensor consisting of a number of the above-described light sensor circuits arranged to form a matrix of pixels, wherein sensor signals from respective pixels are read by scanning in a time series and the pixels can be initialized in time adapted to the readout scanning of respective sensor signals.

The image sensor is composed of 4×4 pixels D11~D44 arranged in a matrix of pixel circuits, in which pixel lines are selected one by one with respective selecting signals LS1~LS4 successively output from a pixel line selecting circuit 1 and pixels in each selected pixel line are readout one by one as respective sensor signals in such a manner by selecting signals DS1~DS4 successively output from a pixel selecting circuit 2 turned on by corresponding switches SW1~SW4 to read respective pixel signals Vo in a time series. In FIG. 9, numeral 4 designates a power source for gate voltage VG of the transistor Q1 and numeral 6 designates a power source for a drain voltage VD of the transistor Q1.

The image sensor is provided with a voltage switching-over circuit 5 by which a drain voltage VD of each transistor Q1 for each pixel is changed from a normal high-level H to an initializing lower level L and reversed by the effect of specified timing pulses when selecting each line of pixels.

Figure 10:
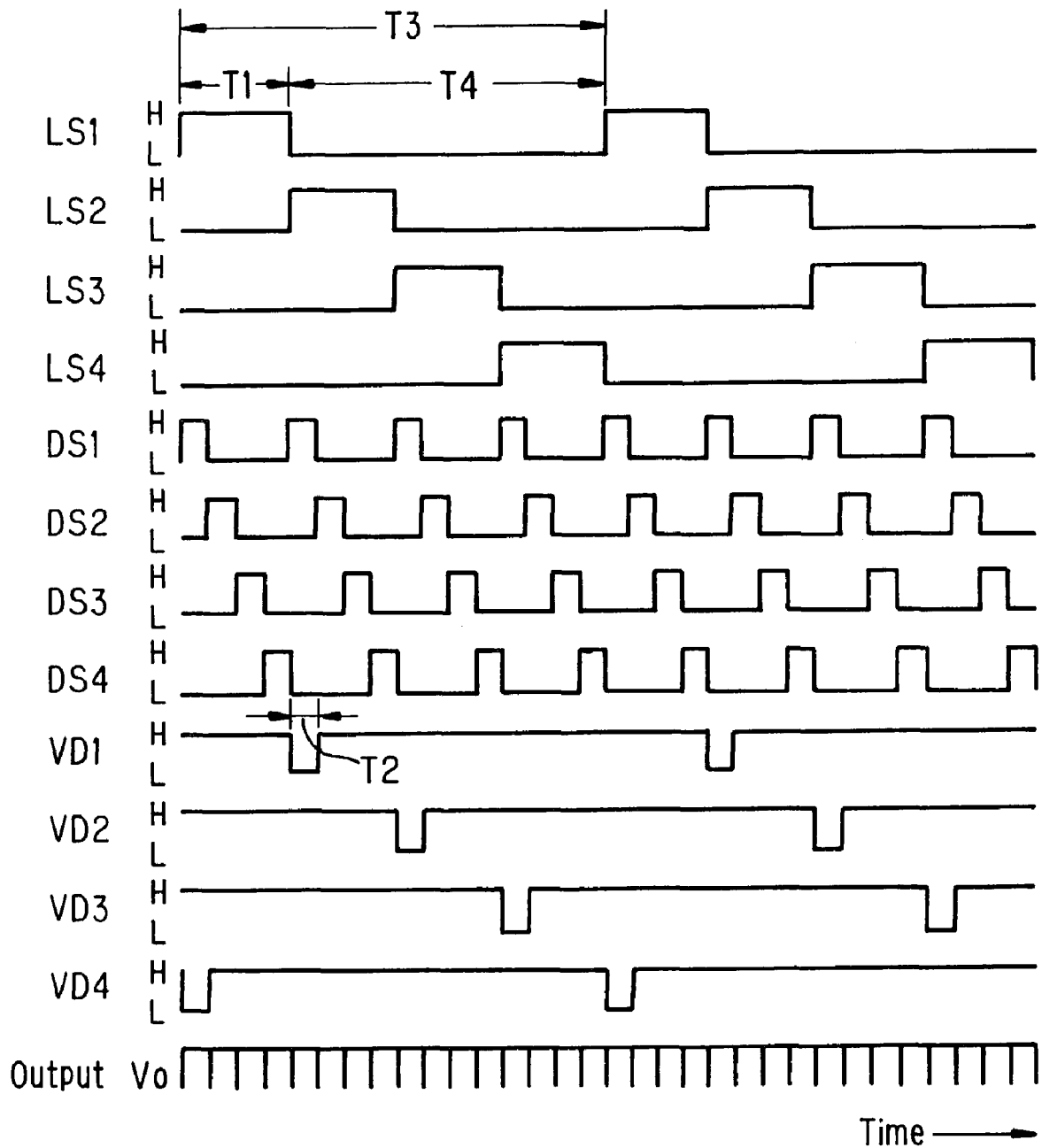
FIG. 10 is a time chart of signals from portions of the image sensor of FIG. 9.

The operation of the above-described image sensor to which the present invention is applied will be described with reference to FIG. 10 showing a time chart of signals generated at respective portions of the image sensor.

Once the pixel-line selecting signal LS1 reaches the high level H, the first pixel line including pixels D11, D12, D13 and D14 is selected and, during a specified period of time T1 of the signal LS1 remaining at the high level H, pixel selecting signals DS1~DS4 successively reach the high level H to start the successive reading of pixel signals Vo from the pixels D11, D12, D13 and D14.

As soon as the pixel-line selecting signal LS1 was changed to the low level L, a next pixel-line selecting signal LS2 is changed to the high level H to select the second pixel line containing pixels D21, D22, D23 and D24. For a specified period T1 of the signal LS2 remaining at the high level, the pixel selecting signals DS1~DS4 successively reach the high level H to start the successive reading of pixel signals Vo from pixels D21, D22, D23 and D24.

Similarly, with the pixel-line selecting signals LS3 (LS4) changed to the high level H, the third (fourth) pixel line is selected and then, for a specified period T1 for which the signal LS3 (LS4) remains at the high level H, the pixel selecting signals DS1~DS4 successively reaches the high level H to start the successive reading of pixel signals Vo from pixels D31, D32, D33 and D34 (D41, D42, D43 and D44).

When the pixel-line selecting signal LS1 was changed to the low level L after the period T1, the drain voltage VD1 for the pixels D11, D12, D13 and D14 in the first selected line is turned to the low level L for a specified period T2 to make the pixels initialized and prepared for the next cycle of reading the pixel signals, which cycle will be performed after an elapse of one cycle time T3. When the pixel-line selecting signal LS2 was changed to the low level L after the period T1, the drain voltage VD2 for the pixels D21, D22, D23 and D24 in the second selected line is turned to the low level L for the specified period T2 to initialize the pixels for the next sensor-signal reading cycle to be performed after an elapse of one cycle time T3.

Similarly, once the pixel-line selecting signal LS3 (LS4) was changed to the low level L after the period T1, the drain voltage VD3 (VD4) for the pixels in the third (fourth) selected line is turned to the low level L for a specified period T2 to initialize the pixels for the next sensor-signal reading cycle to be performed after an elapse of one cycle time T3. Although the drain voltage VDX is turned to the low level L to initialize each pixel circuit with the pixel-line selecting signal LSX (X=1~4) decreased to the low level with an elapse of the period T1, the initializing timing may be within the duration T4 for which the pixel line selection is paused with the pixel-line selecting signal LSX being at the Low level L. The timing of occurrence of signals at respective portions is decided by driving the pixel-line selecting circuit 1, the pixel selecting circuit 2 and the voltage switching-over circuit 5 under the control from an electronic control circuit (not shown).

Initializing each pixel at the timing adapted to scanning for reading each pixel signal may prevent the excessive or insufficient charge accumulating duration for a whole system of the image sensor.

Thus, according to the above-described construction, it is possible to realize an image sensor having a wide dynamic range of its logarithmic output characteristic without causing the afterglow of the pixels.

The present invention provides an image processing device for use in the above-described image sensor, which device can selectively emphasize the contrast of an image taken by the image sensor by selecting an image area of specified luminosity, taking out emphasized output signals of corresponding pixels from an output characteristic conversion table for the image sensor and outputting the thus emphasized image signal.

Figure 11:
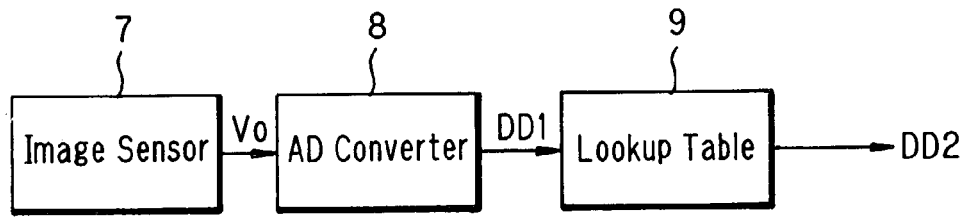
FIG. 11 is an exemplary block diagram of an image processing device according to the present invention.

FIG. 11 shows an image processing device embodying the present invention. The image processing device comprises an analog-digital converter 8 for converting pixel (analog) signals Vo output in a time series from the image sensor 7 into digital signals DD1 and a lookup table 9 containing a predetermined output conversion table from which correspondingly emphasized signals DD2 are selected and outputted. Namely, this device converts any output characteristic of the image sensor into any desirable output characteristic.

Figure 12A:
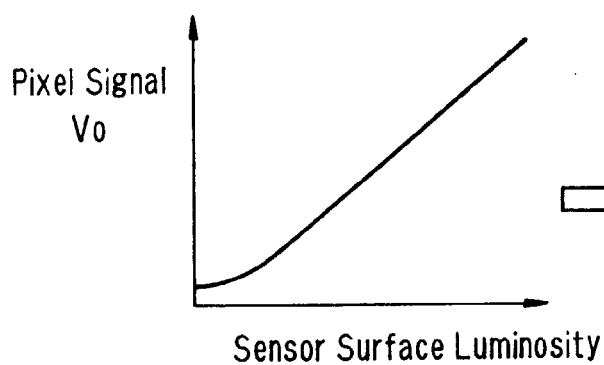
FIGS. 12(a) and 12(b) show an example of conversion of an image sensor output characteristic by using a lookup table.
Figure 12B:
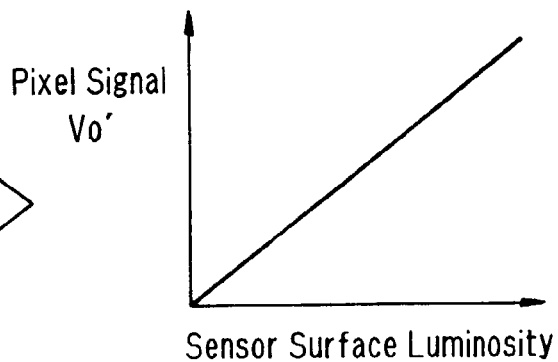

For example, pixel signals Vo of the image sensor having a logarithmic characteristic with a large surface illumination and non-logarithmic linear output characteristic with a small surface illumination as shown in FIG. 12(a) may be converted into pixel signals Vo' having logarithmic characteristics as shown in FIG. 12(b) by using the lookup table 9. An output image signal composed of thus converted pixel signals Vo' may obtain a sufficient wide dynamic range for the lightest to the darkest areas of the output image.

Figure 13A:
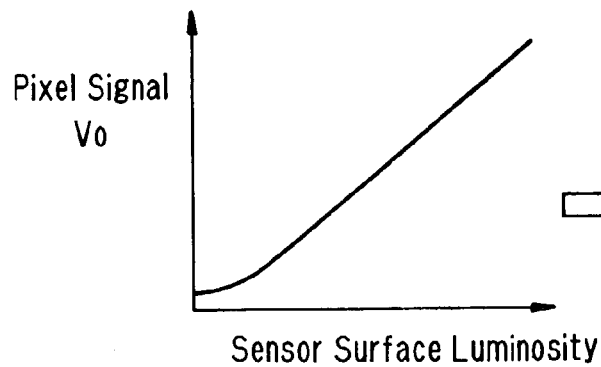
FIGS. 13(a) and 13(b) show another example of conversion of an image sensor output characteristic by using a lookup table.
Figure 13B:
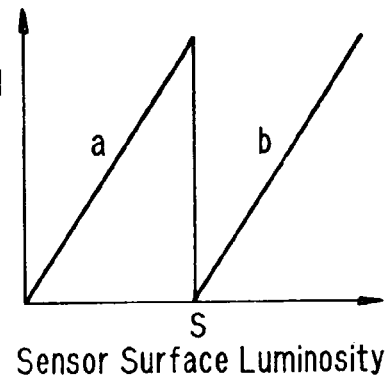

FIGS. 13(a) and 13(b) show a case when an output pixel signal of the image sensor 7 having a logarithmic and a non-logarithmic linear output, as shown in FIG. 13(a), is converted by using the lookup table 9 into a signal having a logarithmic characteristic "a" or "b" shown in FIG. 13(b) when the sensor surface illumination is less or not less than the threshold S.

FIGS. 14(a) and 14(b) show a case when an output pixel signal of the image sensor 7 having logarithmic and non-logarithmic portions, as shown in FIG. 14(a), is converted by using the lookup table 9 into a signal having a logarithmic characteristic "c" or "d" shown in FIG. 14(b) when the sensor surface illumination is within the range S1 to S3 or S2 to S4.

The characteristics of pixel signals Vo output from the image sensor 7 can be thus converted into output signals having logarithmic characteristics defined by a threshold or either of two ranges of the surface illumination of the sensor. This makes it possible to easily carry out the post-processing of the output image of the image sensor in respect to, for example, the multi-gradation sampling with a small amount of information. The image processing device according to the present invention is intended to convert an image taken by the image sensor 7 into an image having the emphasized contrast in such a manner that a pixel signal of a low-luminance (dark) area and a pixel signal of a high-luminance (bright) area of the image are selected and emphasized respectively and other areas are put to zero level to obtain an image with the emphasized contrast between the bright area and the dark area.

FIG. 15 shows the luminance distribution Ka for a road surface and a neighboring area on an image taken in a tunnel and the luminance distribution Kb for a road surface and a neighboring area on an image taken during a fine day outside the tunnel. Now, let's assume the case of automatically driving a vehicle observing a front road image taken by an image sensor (pickup camera) and following a white line marked on the road, which is also recognizable on the road image. In this instance, a road image signal from an area of luminance distribution of 0.1 to 1 cd/m$^2$ is needed while traveling only in the tunnel whereas an image signal from an area of luminance distribution of 1E3 to IE5 cd/m$^2$ is needed while traveling on the road outside of the tunnel. Namely, if the image sensor 7 has an output characteristic A shown by a straight line in FIG. 15, necessary information is absent in an area of luminance of no more than 0.1 cd/m$^2$, an area of luminance of 1 cd/m$^2$ to 1E3 cd/$^2$ and an area of luminance of no less than 1E5 cd/m$^2$. Consequently, the output range of the image sensor contains unnecessary parts in this instant.

In extracting a white line from the image taken by the image sensor 7, it is therefore effective to extract pixel signals belonging to the luminance distribution areas Ka of 0.1 to 1 cd/m$^2$ and Kb of 1E3 to IE5 cd/m$^2$. This makes it easier and faster to extract the white line image by saving the time to process unnecessary information.

Figure 16:
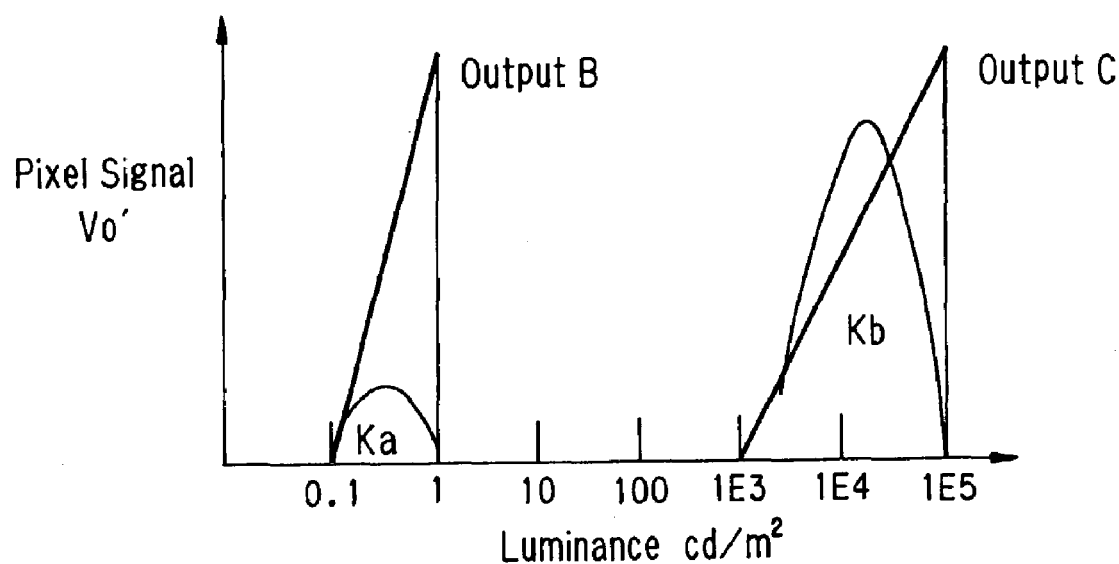
FIG. 16 shows an example of conversion of image sensor output characteristic shown in FIG. 15 in accord with a luminance distribution area of an image.

In practice, the portion Ka (0.1 to 1 cd/m$^2$) and the portion Kb (IE3 to 1E5 cd/m$^2$) of the output characteristic A shown FIG. 15 are converted into portions B and C, respectively, of the output characteristic shown in FIG. 16 by using the lookup table 9.

The contrast of necessary visual information contained in the image taken by the image sensor 7 can be emphasized by thus converting the output characteristic of the image sensor. Consequently, the extraction of a white line in a road image can be surely conducted without affection of difference of luminance between the darkest part (in the tunnel) and the brightest part (out of the tunnel) of the same image. The converted output characteristics B and C of the image sensor may be treated as of two parts of the same image or of two separate images.

Figure 17:
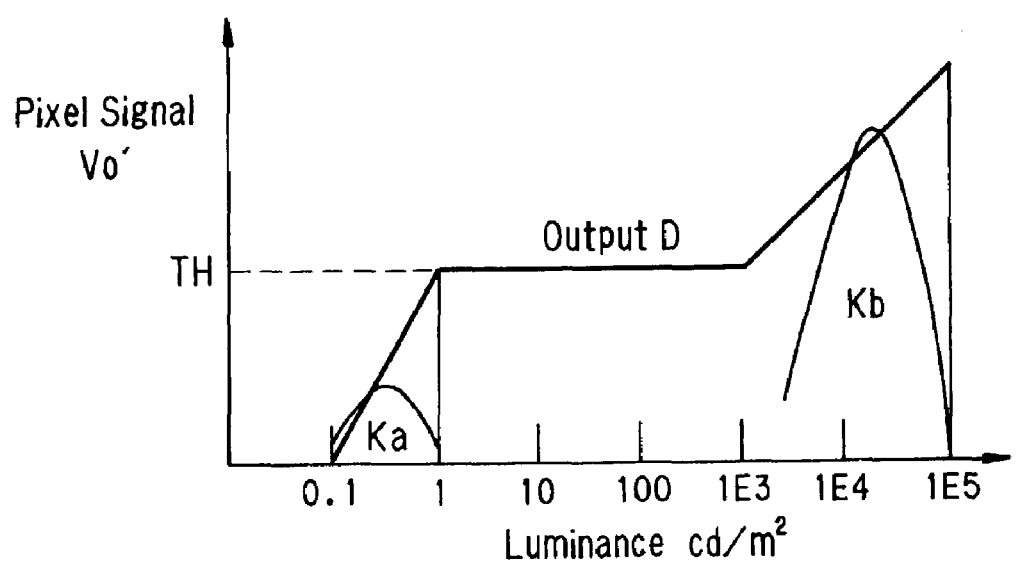
FIG. 17 shows another example of conversion of image sensor output characteristic shown in FIG. 15 in accord with a luminance distribution area of the image.

FIG. 17 shows another example of converting the output characteristic of the image sensor 7 by using the lookup table. In this instance, the output of the image sensor 7 in the intermediate area between the low luminance distribution area Ka (of 0.1 to 1 cd/m$^2$) and the high luminance distribution area Kb (of 1E3 to 1E5 cd/m$^2$) is converted into an output D defined by a fixed threshold TH. This makes it possible to increase the contrast between the dark portion (within the tunnel) and the bright portion (a fine day outside of the tunnel) on the same image and to judge the outside and the inside of the tunnel by the threshold.

Figure 27:
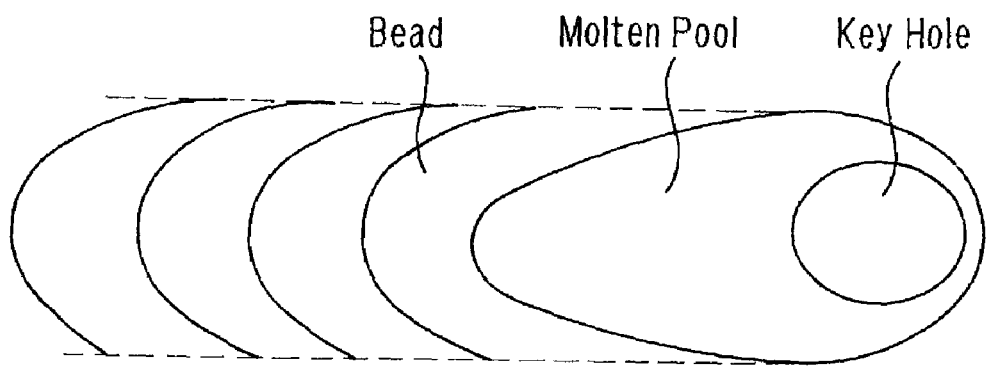
FIG. 27 is illustrative of a state of weld joint made by laser beam welding.

The above-described effect can be also obtained when monitoring the laser beam welding operation, shown in FIG. 27, by video taken by the image sensor 7. In practice, the contrast of welding portion including a molten pool, a bead and a groove can be emphasized.

As described above, according to the present invention, the output characteristic of the image sensor 7 having a wide dynamic range obtained by its logarithmic output characteristic can be selectively converted by using the lookup table 9 to obtain an image featured by adequately emphasized contrast between the bright (high light) portion and the dark (shadow) portion therein. In this case, it is also possible to adequately select areas to be emphasized by using a ND filter and a diaphragm.

Figure 18:
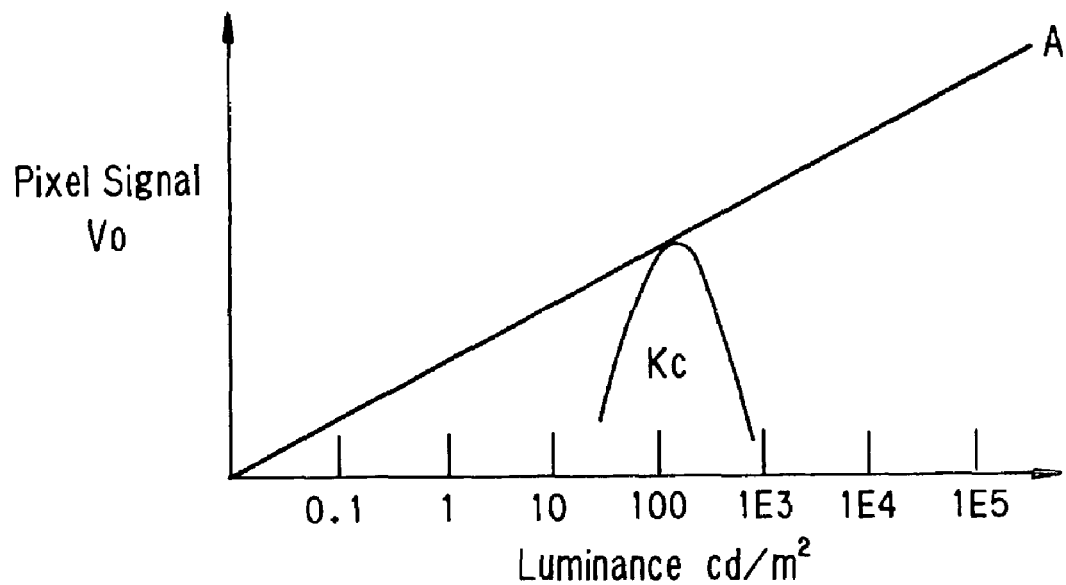
FIG. 18 is a graph showing a relation between the output characteristic of an image sensor and a luminance distribution area of an output image.
Figure 19:
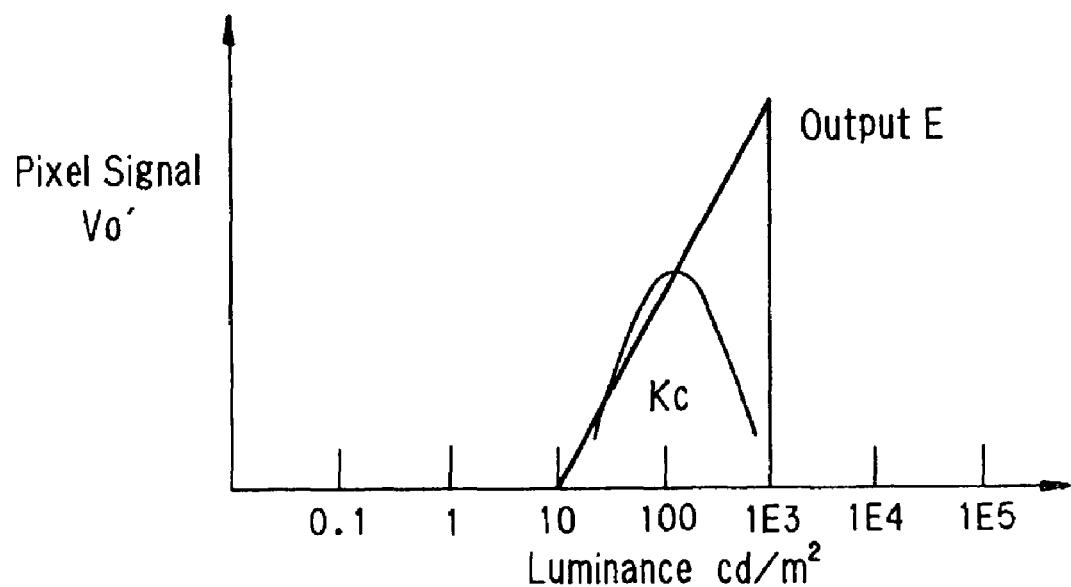
FIG. 19 is an example of conversion of the image sensor output characteristic shown in FIG. 18 in accord with a luminance distribution area of the image to be output.

FIGS. 18 and 19 show another example of converting the output characteristic of the image sensor 7 by the lookup table 9. In this instance, an output of a luminance distribution area Kc of the characteristic A (FIG. 18) of the image sensor 7 is selected and emphasized so that it may obtain the output characteristic E of FIG. 19.

Figure 20:
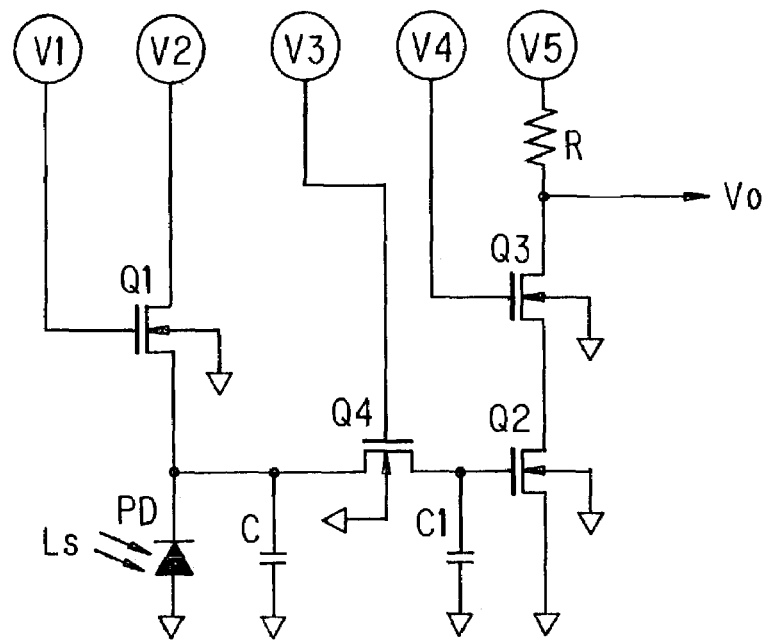
FIG. 20 is another example of an electronic circuit diagram of a light sensor circuit.
Figure 21:
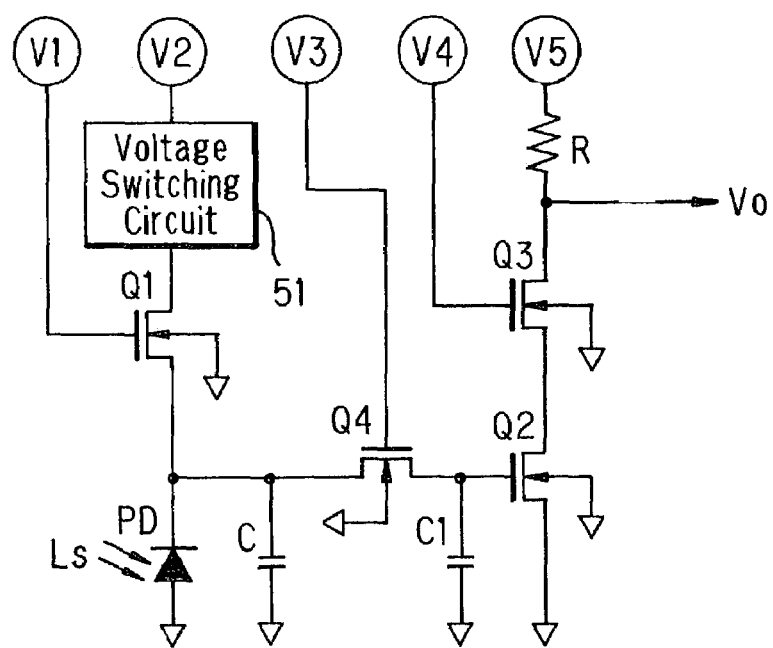
FIG. 21 is a further example of an electronic circuit diagram of a light sensor circuit.
Figure 22:
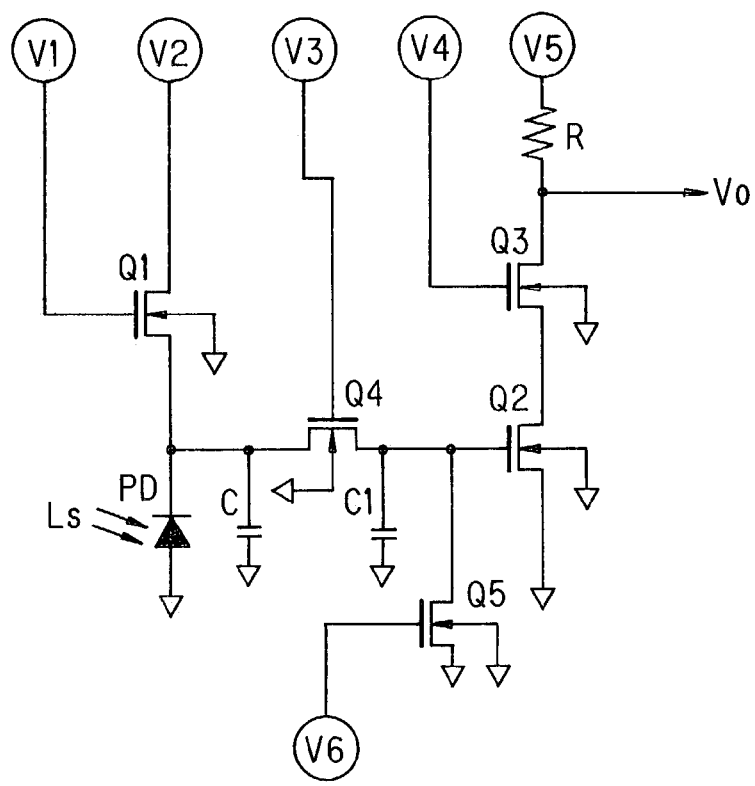
FIG. 22 is a still further example of an electronic circuit diagram of a light sensor circuit.

In addition to the light sensor circuit shown in FIG. 1, light sensor circuits shown in FIGS. 20 to 22 may be used for the image sensor 7.

The light sensor circuit shown in FIG. 20 has a shutter function (sample-and-hold function), which is based on the light sensor circuit shown in FIG. 1 and further provided with a capacitor C1 for accumulating a terminal voltage Vpd of a photo diode PD as a pixel signal and a MOS transistor Q4 for transferring an electric charge of a parasitic capacitor C of the photo diode PD to the capacitor C1.

Figure 23:
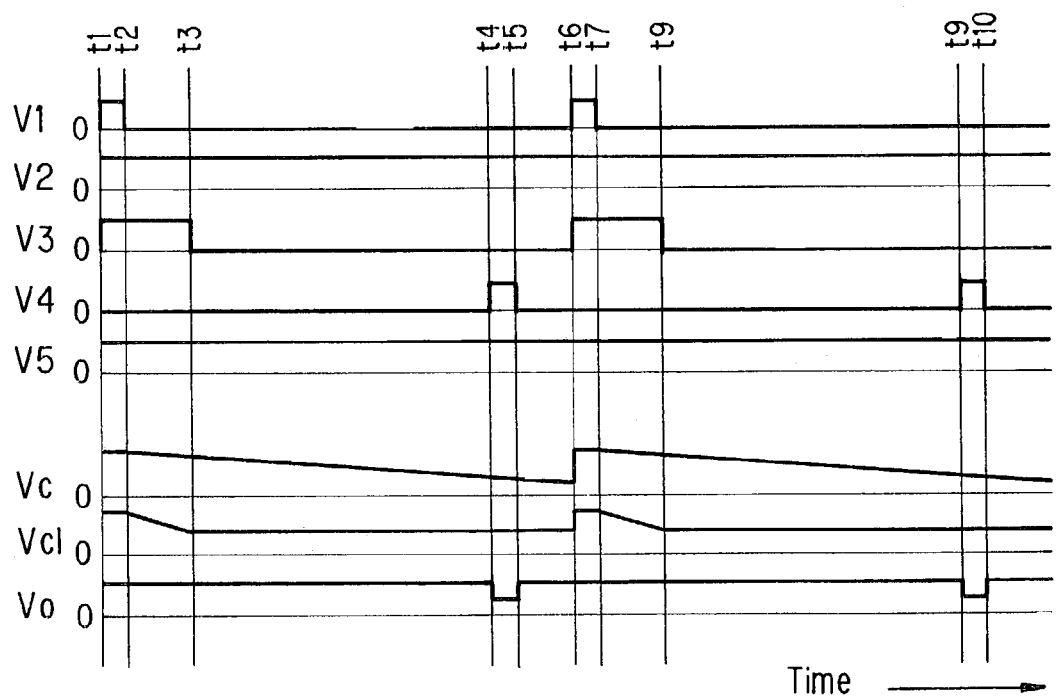
FIG. 23 is a time chart of signals from portions of the light sensor circuit shown in FIG. 17.

In this light sensor circuit, the shutter is opened and closed by giving control signals as shown in FIG. 23 for outputting pixel signals according to opening periods of the shutter. Namely, a transistor Q1 is turned ON when driving voltage V1 increases to a high level at timing t1~t2 to give an electric charge to the parasitic capacitor C of the photodiode PD. Once the photodiode PD is illuminated, sensor current flows causing the capacitor C1 to reduce the electric charge by an amount proportional to the flowing current.

The transistor Q4 is turned ON at timing t1~t3 (shutter open period) causing the terminal voltage Vc1 of the capacitor C1 to be equal to the terminal voltage Vc of the parasitic capacitor C. The transistor Q4 is then turned OFF at timing t3 causing the terminal voltage Vc1 of the capacitor C1 to be held. When the transistor Q3 is turned ON at timing t4~t5, a pixel signal Vo is output through a resistance R.

In the above-described light sensor circuit, the transistor Q4 is turned OFF at timing t3 and the capacitor C1 maintains a constant electric charge until the transistor Q4 is turned ON to transfer the electric charge from the parasitic capacitor C to the capacitor C1. In other words, during the turned-off period of the transistor Q4 (a holding time of the capacitor C1), the same output can be obtained as a pixel signal Vo independent of a change in the terminal voltage Vc of the parasitic capacitor C. A highly reproducible pixel signal can be obtained by the operation of the light sensor circuit of FIG. 20 according to the control timings shown in FIG. 23.

Figure 24:
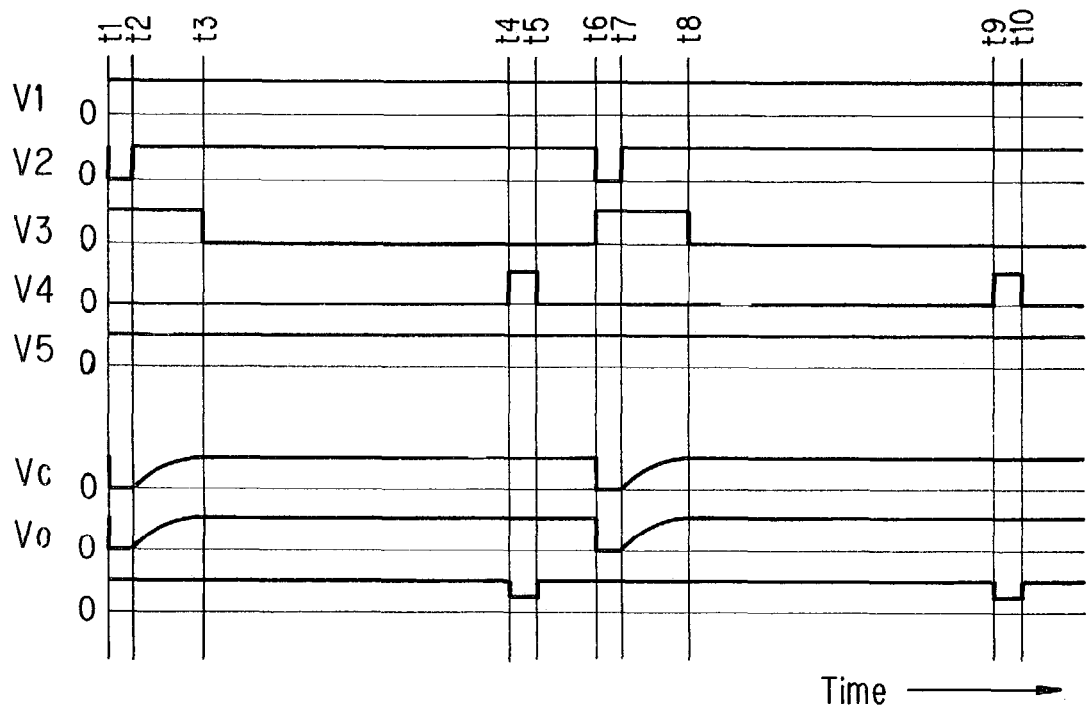
FIG. 24 is a time chart of signals from portions of the light sensor circuit shown in FIG. 18.

The light sensor circuit shown in FIG. 21, which has the shutter function shown in FIG. 20, is further provided with a voltage switching-over circuit 51 for decreasing a drain voltage VD of a transistor Q1 to remove a remaining electric charge in a photodiode PD, thereby initializing the pixel circuit. This may prevent the occurrence of afterglow of a pixel signal when a photodiode is insufficiently illuminated. This light sensor circuit operates with control signals generated at respective parts at respective timings as shown in the time chart of FIG. 24.

Figure 25:
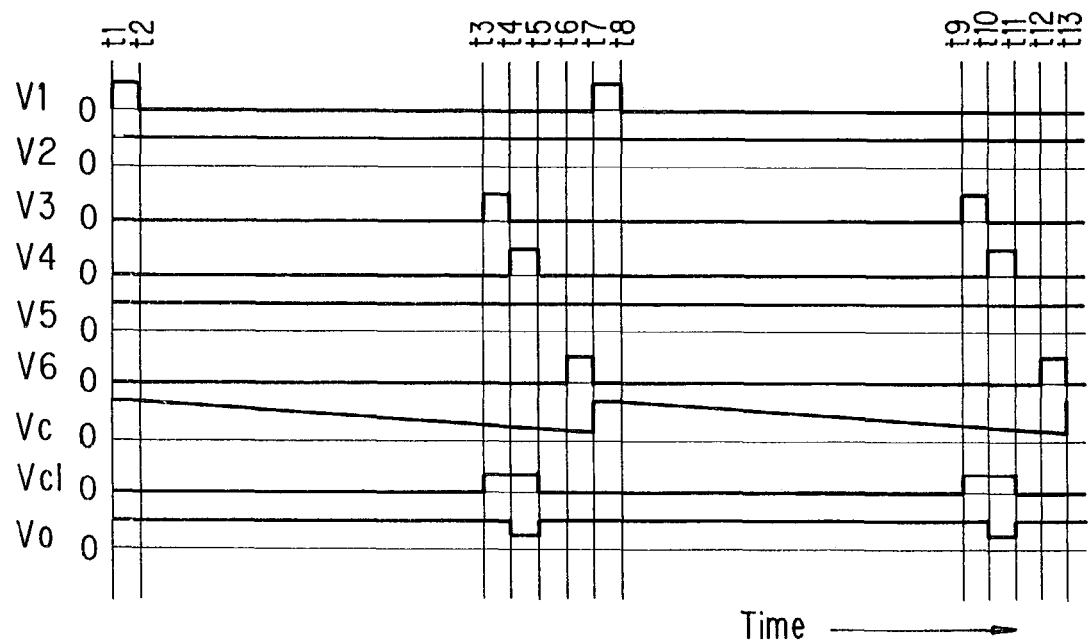
FIG. 25 is a time chart of signals from portions of the light sensor circuit shown in FIG. 19.

FIG. 22 shows another construction of a light sensor circuit having a shutter function, wherein a transistor Q5 is further provided for charging and discharging a capacitor C1. The electric charge of the capacitor C1 can be discharged by the transistor Q5 so that the electric charge of the parasitic capacitor C may be transferred with high reproducibility to the capacitor C1. The operation of the thus constructed light sensor circuit differs from that of the light sensor circuit of FIG. 20 by the fact that its pixel signal is initialized by discharging the capacitor C1 when the transistor Q5 is turned ON at timing t6~t7 as shown in FIG. 25.

As is apparent from the foregoing, the image processing device according to the present invention is capable of emphasizing a specified luminance area of an image taken by an image sensor in such a manner that the output characteristic of the image sensor is converted by using a conversion table to emphasize image sensor output in any plural desirable luminance areas. It offers such an advantage that the contrast of each image portion in any luminance areas of an image taken by the image sensor having a wide dynamic range of a logarithmic output can be emphasized, making it possible to adequately monitor any bright-and-dark working site such as for example a laser beam welding site.

What is claimed is:

1. An image processing device for emphasizing a specified luminance area of an image taken by an image sensor, wherein any plural luminance areas of the image are selected and sensor outputs corresponding to the selected luminance areas are emphasized by using an image sensor output characteristic conversion table to increase a contrast of each image portion in each of the selected luminance areas, and
   wherein a light sensor circuit representing at least one unit pixel of the image sensor has a logarithmic output characteristic, the light sensor circuit comprising a MOS transistor for converting a current flowing in a photo diode into a voltage signal having a logarithmic characteristic in a weak inverse state and having a control means for discharging a remaining electric charge of a parasitic capacitor of the photo diode by preliminary changing a drain voltage of the MOS transistor.

2. An image processing device as defined in claim 1, wherein an image sensor output of each luminance area other than the emphasized luminance areas is fixed to zero or a specified value.

3. An image processing device as defined in claim 1, wherein a light sensor circuit representing the at least one unit pixel of an image sensor has a shutter function.

4. An image processing method for emphasizing a specified luminance area of an image taken by an image sensor, comprising the steps of selecting any plural luminance areas of the image, and emphasizing the sensor outputs corresponding to the selected luminance areas by using an image sensor output characteristic conversion table to increase a contrast of each image portion in each of the selected luminance areas and
   wherein a light sensor circuit representing at least one unit pixel of the image sensor has a logarithmic output characteristic, the light sensor circuit comprising a MOS transistor for converting a current flowing in a photo diode into a voltage signal having a logarithmic characteristic in a weak inverse state and having a control means for discharging a remaining electric charge of a parasitic capacitor of the photo diode by preliminary changing a drain voltage of the MOS transistor.

5. An image processing method as defined in claim 4, further comprising the step of setting an image sensor output of each luminance area other than the emphasized luminance areas to zero or a specified value.

6. An image processing method as defined in claim 4, wherein a light sensor circuit representing the at least one unit pixel of the image sensor has a shutter function.

* * * * *